United States Patent [19]

Sears

[11] Patent Number: 4,495,731

[45] Date of Patent: Jan. 29, 1985

[54] VEHICLE HATCH MOUNTING ASSEMBLY

[75] Inventor: Ronald E. Sears, Bloomfield Hills, Mich.

[73] Assignee: Transpec, Inc., Troy, Mich.

[21] Appl. No.: 438,511

[22] Filed: Nov. 1, 1982

Related U.S. Application Data

[63] Continuation of Ser. No. 317,944, Nov. 4, 1981.

[51] Int. Cl.³ .................................................. E05D 7/00
[52] U.S. Cl. ........................................ 49/402; 49/505; 296/218
[58] Field of Search ................. 49/504, 505, 397, 402; 296/218

[56] References Cited

U.S. PATENT DOCUMENTS

| | | | |
|---|---|---|---|
| 1,995,939 | 3/1935 | Osten | 49/485 X |
| 3,545,135 | 12/1970 | Lieber | 49/505 |
| 3,868,789 | 3/1975 | Gates | 49/504 X |
| 4,095,640 | 6/1978 | Beckerer, Jr. | 49/402 X |
| 4,130,966 | 12/1978 | Kujawa et al. | 49/397 X |

Primary Examiner—Kenneth Downey
Attorney, Agent, or Firm—Reising, Ethington, Barnard, Perry & Milton

[57] ABSTRACT

A vehicle escape or ventilating hatch mounting assembly includes a mounting ring to be received in the hatch opening of the vehicle and to which the hatch is directly releasably connected with a trim bezel extending within the hatch opening and cooperating with the ring to finish off the opening.

6 Claims, 5 Drawing Figures

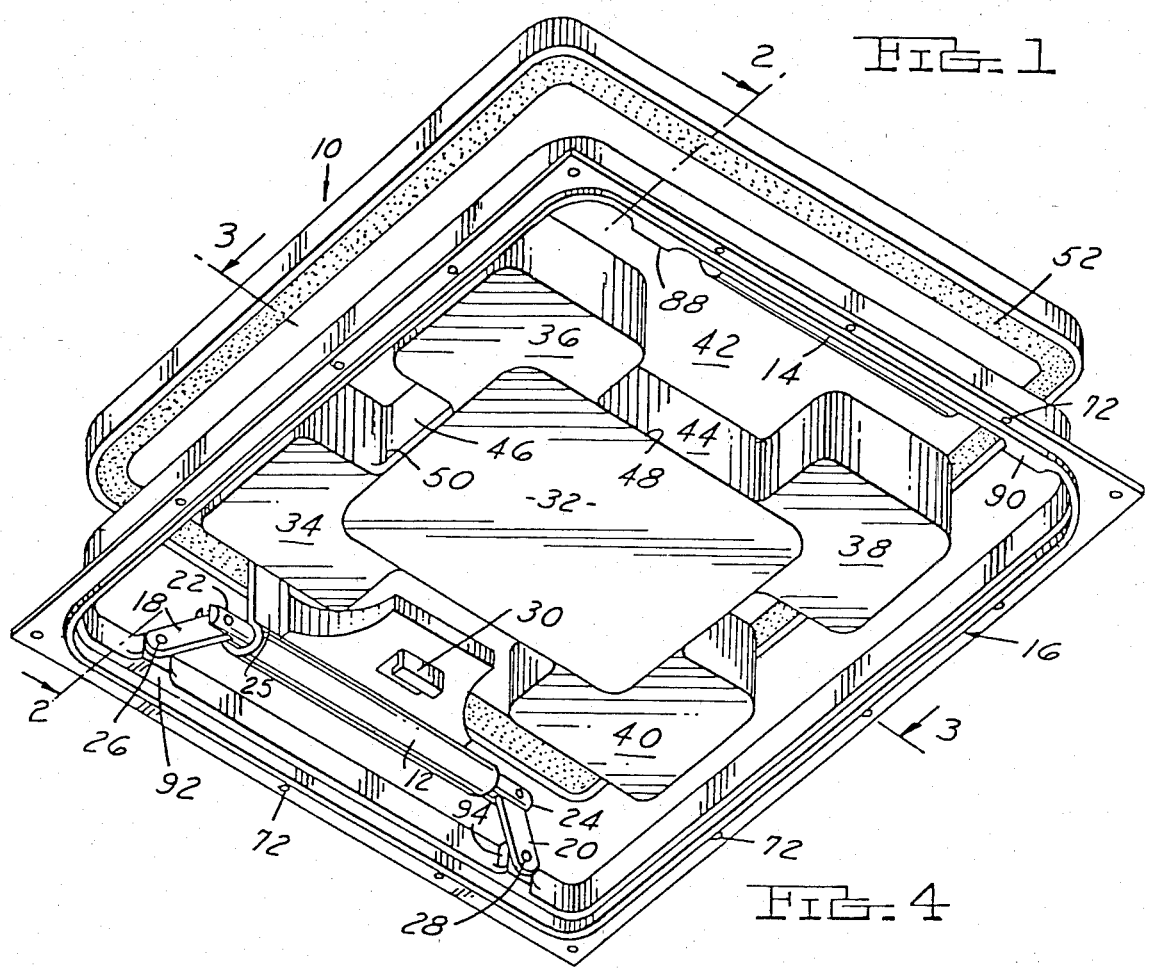
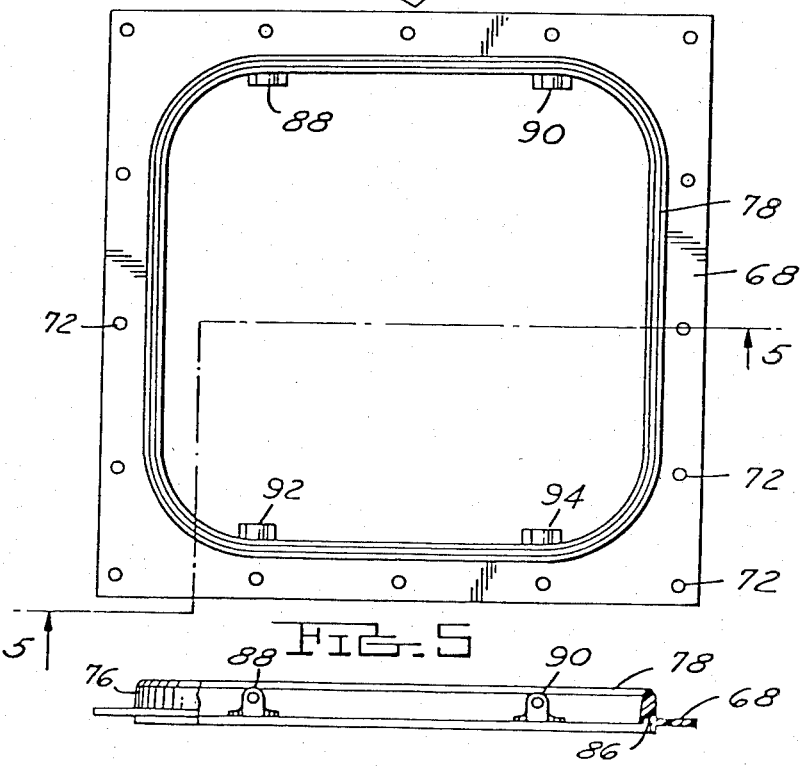

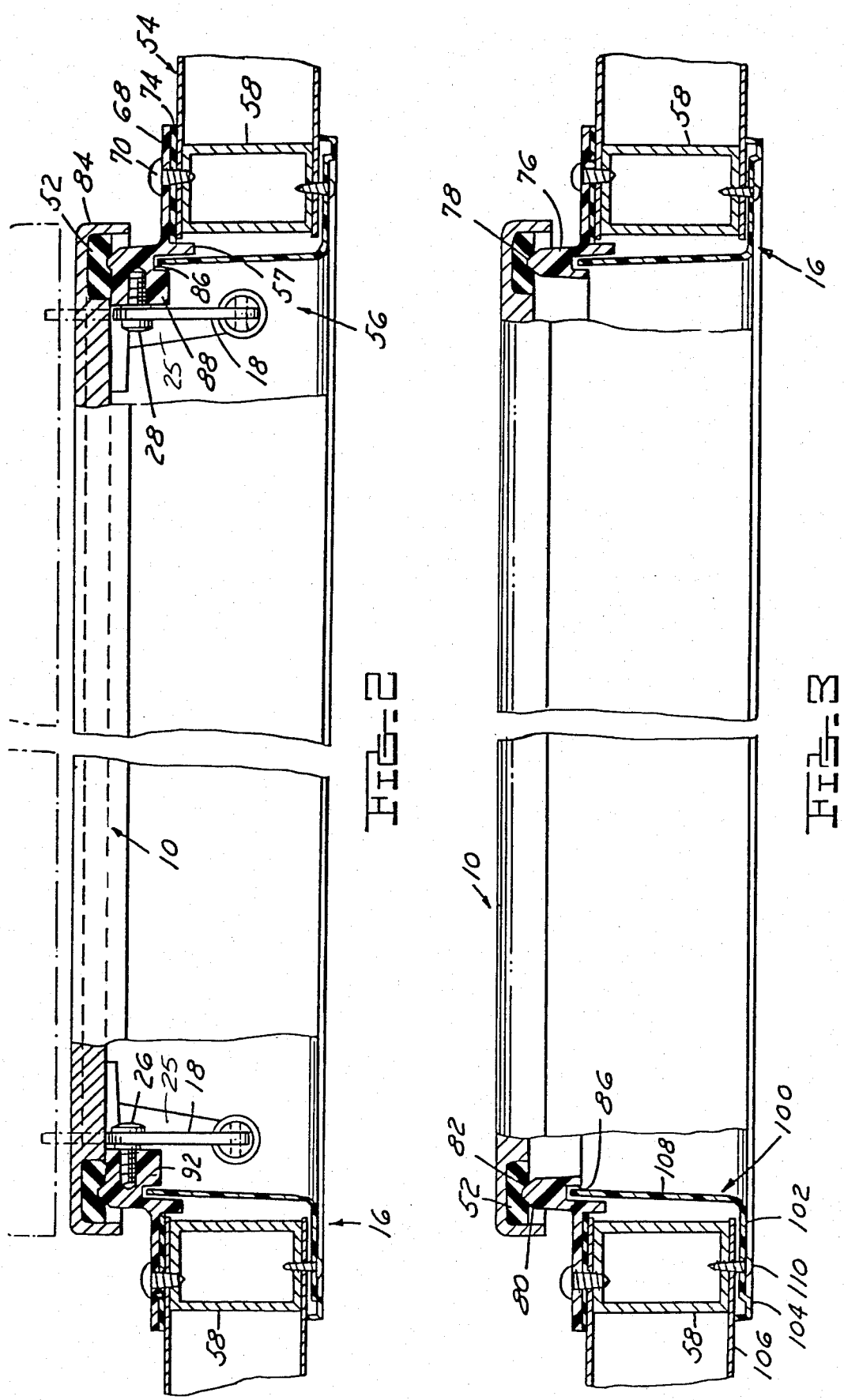

VEHICLE HATCH MOUNTING ASSEMBLY

TECHNICAL FIELD

This invention relates to escape or ventilating hatches for vehicles and more particularly to an improved mounting arrangement for such hatches and is a continuation of my copending application Ser. No. 317,944, filed Nov. 4, 1981.

BACKGROUND ART

Escape or ventilating hatches for buses, vans, and the like in recent years have been mounted in the hatch opening on an aluminum extrusion formed into a square or rectangular shaped ring and secured within the hatch opening of the vehicle. Such rings have been of such large manufacturing tolerances that it has often been difficult to effect a weathertight seal between the ring and hatch. In addition, manufacturing tolerances for such rings and the somewhat flimsy construction thereof has made it necessary to provide special mounting plates for the escape hatches. One such escape hatch is shown in U.S. Pat. No. 4,021,073, with the mounting plates being designated at 22 and 122. Such patent is incorporated in this disclosure by reference. Because of such plates, it is difficult to cover or conceal the rings with a trim molding, and therefore the hatch mounting has an "unfinished" appearance.

While it would be possible to manufacture an aluminum mounting ring of sufficiently close tolerances that an effective weathertight seal between the ring and the escape hatch could be made, the cost thereof would render the hatch very expensive. Accordingly, I have sought to provide a mounting ring which will be of strong and durable construction and of sufficiently close manufacturing tolerances that an effective weathertight seal between it and the hatch may be provided. In addition, I have sought to provide a mounting ring which avoids the use of the aforesaid mounting plates and thus enables ready association with the ring of a trim molding to give a finished appearance to the hatch frame.

DISCLOSURE OF THE INVENTION

I have discovered that a highly satisfactory mounting ring for a vehicle escape hatch may be provided by forming the ring of a structural plastic material such as a hot stamped fiber reinforced plastic or a molded unreinforced plastic material. In any case, the ring is shaped to provide a sealing flange whose sealing edge lies in a common plane such that the sealing edge will effect a reliable weathertight seal with the hatch structure. In addition, the ring includes a bezel receiving pocket for reception thereinto of a trim bezel ring. The trim bezel may be of a generally L-shaped cross-section having one leg received into the aforementioned pocket and another leg conveniently overlying the marginal edge of the headlining around the hatch opening to cover and conceal the ring and the joint between the ring and the headlining.

BRIEF DESCRIPTION OF DRAWINGS

FIG. 1 is a perspective view of an escape hatch and my improved mounting ring, showing the hatch in an open or ventilating position;

FIG. 2 is a cross-sectional view taken on the line 2—2 of FIG. 1, showing the hatch closed in solid outline and open in phantom outline;

FIG. 3 is a cross-sectional view taken on the line 3—3 of FIG. 1;

FIG. 4 is a top view of the mounting ring; and

FIG. 5 is a cross-sectional view taken substantially on the line 5—5 of FIG. 4.

BEST MODE FOR CARRYING OUT THE INVENTION

As shown in FIG. 1, the hatch 10 is mounted by a pair of hinge devices 12 and 14 on my improved mounting ring 16. The hatch is shown in the raised position. The details of construction of the hinge assemblies 12 and 14 are more particularly described in U.S. Pat. No. 4,021,073, which is incorporated herein by reference. Suffice it that each of such assemblies includes a pair of links 18 and 20 pivotally connected at one end to the hatch through plungers 22 and 24 and plate 25 and at the opposite end are connected to the mounting ring 16 as at 26 and 28. With the hatch in the raised position shown in FIG. 1, actuation of a latch handle 30 enables release of the hinge assembly 14 to a fully opened position, allowing a passenger in a vehicle in which the hatch is mounted to escape. The hatch assembly is normally used for emergency exit purposes and for ventilation.

The hatch 10 is preferably formed of plastic and is provided with a central reinforcing area 32 having four large bosses or the like 34, 36, 38 and 40 integral with the hatch lid portion 42. The central portion 32 overhangs the vertical walls 44, 46, and complementary walls in opposite positions which are not visible from FIG. 1 to provide fingerholds at the lips 48 and 50. A sponge-like gasket 52 is disposed within a recess around the margin of the inside of the hatch to bear against a sealing edge of the ring 16 as disclosed in FIGS. 2 and 3.

I have discovered that hatch 10 may be mounted in a vehicle enclosure such as in the roof or side wall without the necessity of the mounting plates 22 and 122 shown in U.S. Pat. No. 4,021,073 and currently used to mount the links 18 and 20, and a reliable seal may be effected by the gasket 52 against the sealing edge of the ring 16, and the interior of the ring covered and concealed by a trim molding, if the ring 16 is made as hereinafter described. As shown in FIGS. 2 and 3, the vehicle enclosure, such as the roof 54, is provided with a hatch opening 56 framed by structural channel members 58 of the vehicle which surround the opening. The hatch is mounted to cover this opening. To effect the mounting, the ring 16 is provided with a laterally extending continuous mounting flange 68 which extends completely around the ring and is secured to the roof 54 by fasteners 70 which extend through apertures 72 in the mounting flange 68 and are driven into the channel members 58. A suitable sealer 74 may be provided between the mounting flange 68 and the roof 54.

The ring 16 also has a continuous sealing flange portion 76 integral with the mounting flange portion 68. The sealing flange portion has an upwardly facing sealing edge 78 defined by a relatively narrow flat surface between a pair of bevels 80 and 82 at the upper edge of the sealing flange portion. The sealing edge 78 lies in a common plane and is adapted to abut the gasket 52 and lies outwardly of the roof 54 of the vehicle with the peripheral edge 84 of the hatch disposed outwardly of the sealing flange portion 76 as best shown in FIGS. 2 and 3. The sealing flange portion is centered within the hatch opening 56. To facilitate this centering, a locating flange 57 is provided which enters the hatch opening. A peripherally continuous bezel receiving pocket 86 is disposed within the inner periphery of the sealing flange portion 76 and opens downwardly as best shown in FIGS. 2 and 3. In addition, there are four bosses 88, 90, 92 and 94 formed integrally with the mounting ring into which the pivot members 26 and 28 are received. For this purpose each of the bosses may be drilled and tapped. The pivot members may comprise threaded elements which are screw threaded into the threaded holes in the bosses. It will be noted that the downwardly opening bezel receiving pocket is disposed laterally outside of the bosses.

A trim bezel 100 is adapted to overlie the hatch opening on the inside of the vehicle and cover and conceal the joint between the mounting ring and the hatch opening. The trim bezel is generally L-shaped in cross-section as shown in FIGS. 2 and 3, and includes a laterally extending leg 102 whose outer marginal edge is channel shaped as at 104 to stiffen the margin and provide a sharp trimline where the bezel meets the headliner 106. The trim bezel is also provided with a second leg 108 which projects upwardly and at its upper edge is received within the pocket 86. Fasteners 110 may be threaded through the trim bezel and into the channel 58 to secure the bezel in place. The length of the leg 108 may be trimmed to accommodate varying thicknesses of the roof between the headliner 106 and the bezel receiving pocket 86 of the ring.

The mounting ring 16 can be made of any suitable high strength structural or load bearing plastic material which can be fabricated to the desired form. Due to its relative ease of fabrication and dimensional stability, I prefer to form ring 16 from a glass filled nylon sold under the name CARRON STX by Allied Chemical Company. This material is glass mat reinforced nylon which flows out during stamping and may be formed by the technique known as hot stamping, in which the material is placed between heated dies which are brought together to shape the material. The material may be preheated before being placed between the dies so that it will soften and conform to the configuration of the dies. In lieu of glass filled nylon, glass filled polypropylene may be used, and such material is sold under the name AZDEL by PPG. In both cases the glass is in the form of glass fibers woven in a mat and laminated with the nylon or polypropylene.

Another family of structural or high strength plastics which may be used are the polycarbonates marketed by General Electric under its LEXAN trademark. The LEXAN materials may be used with or without a reinforcing glass filler. In the case of LEXAN, the ring would be injection molded and, if reinforced, the filler would be randomly aligned glass fibers in lengths up to ¼" long.

Since it is a non-load bearing member and consists of a relatively simple shape, trim bezel 100 is preferaby vacuum formed of NORYL, a flame resistant plastic sold by General Electric Company meeting ASTME 162 specification. The trim bezel may be formed in various colors to complement the color of the headlining 106.

What is claimed is:

1. In an assembly of the type for mounting an outwardly opening hatch (10) in a passenger vehicle enclosure or the like, said assembly including a mounting ring (16), said ring having an integral continuous sealing flange portion (76) having one edge (78) thereof disposed outwardly and laying in a common plane to form a hatch sealing edge, said mounting ring including a locating flange (57) for centering the sealing flange with a vehicle hatch opening (56), said ring having an integral mounting flange portion (68) extending laterally outwardly from the sealing flange portion for overlaying the outside marginal edge of the hatch opening, and a plurality of hinge devices (12 and 14) respectively connected both to the hatch and the mounting ring to permit the hatch to be opened and closed relative to the vehicle hatch opening, each hinge device (12 and 14) being disposed within the hatch opening (56) and including a first member (25) fixed to the interior of the hatch, a plurality of hinge supporting elements (88, 90, 92, 94) integrally formed on and projecting laterally inwardly from said mounting ring, each hinge device including second members (18 and 20) pivotally connected to various of the mounting ring supporting elements to enable the hatch to be raised equidistantly above the hatch opening, the improvement comprising:
   a. a downwardly opening bezel receiving pocket (86) formed in the sealing flange of the mounting ring, and
   b. a trim bezel (100) of generally L-shaped configuration having a laterally extending first flange (102) adapted to overlie the inner surface of the vehicle at the marginal edge of the opening (56) in which the hatch mounting assembly is disposed, said bezel including a second flange (108) projecting upwardly within the bezel receiving pocket of the mounting ring whereby the trim bezel conceals the edge of the hatch opening and trims the same.

2. In an assembly of the type set forth in claim 1 wherein the bezel pocket (86) is disposed laterally between the hinge supporting elements (88, 90, 92, 94) and the locating flange (57) and extends above the laterally extending ring flange (68).

3. In an assembly of the type set forth in claim 2 wherein the second bezel flange (108) projects upwardly through the hatch opening (56) and terminates within the bezel pocket (86) above the laterally extending ring flange (68).

4. In an assembly of the type set forth in claim 1 wherein the hinge supporting elements comprise two pairs (88-92 and 90-94) of transversely aligned bosses.

5. In an assembly of the type as set forth in claim 1 wherein the mounting ring is formed of high strength, rigid plastic material from the group consisting of nylon, polypropylene and polycarbonate.

6. In an assembly of the type as set forth in claim 5 wherein the trim bezel is formed of a plastic material relatively softer than the plastic ring material.

* * * * *